United States Patent
Chang et al.

(10) Patent No.: US 8,896,922 B2
(45) Date of Patent: Nov. 25, 2014

(54) DISPLAY DEVICE

(75) Inventors: Yung-Sheng Chang, Hsinchu (TW); Chia-Chun Yeh, Hsinchu (TW); Yao Peng, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 256 days.

(21) Appl. No.: 12/964,373

(22) Filed: Dec. 9, 2010

(65) Prior Publication Data

US 2012/0013983 A1    Jan. 19, 2012

(30) Foreign Application Priority Data

Jul. 13, 2010   (TW) ................. 99122975 A

(51) Int. Cl.
*G02B 5/30*  (2006.01)
*G02B 27/28* (2006.01)
*G02F 1/167* (2006.01)

(52) U.S. Cl.
CPC ..................................... *G02F 1/167* (2013.01)
USPC ................. 359/491.01; 359/483.01

(58) Field of Classification Search
CPC .................. G02F 2001/1678; G02F 1/133502; G02F 1/13338; G02F 2203/34; G02F 1/133514; G02F 1/133603; G02F 26/026; G02F 1/115
USPC ......... 359/491.01, 62, 487.03, 296, 503, 509, 359/488.01; 349/62, 106, 33; 430/31–32, 430/34, 38; 204/450, 600; 250/208.1
See application file for complete search history.

(56) References Cited

U.S. PATENT DOCUMENTS

| | | | | |
|---|---|---|---|---|
| 6,677,062 | B2 * | 1/2004 | Kaneko et al. | 428/697 |
| 8,089,693 | B2 * | 1/2012 | Lin et al. | 359/491.01 |
| 8,186,865 | B2 * | 5/2012 | Wei et al. | 362/601 |
| 2006/0097631 | A1 * | 5/2006 | Lee | 313/504 |
| 2007/0138941 | A1 * | 6/2007 | Jin et al. | 313/503 |
| 2007/0263277 | A1 | 11/2007 | Liang et al. | |
| 2009/0185108 | A1 * | 7/2009 | Park et al. | 349/65 |
| 2009/0207477 | A1 * | 8/2009 | Komatsu et al. | 359/296 |
| 2010/0060974 | A1 * | 3/2010 | Wang et al. | 359/296 |

FOREIGN PATENT DOCUMENTS

| | | |
|---|---|---|
| CN | 1777838 | 5/2006 |
| CN | 101002129 | 7/2007 |
| CN | 101221338 | 7/2008 |
| TW | 200502886 | 1/2005 |
| TW | 200504437 | 2/2005 |
| TW | 200715018 | 4/2007 |
| TW | 200926309 | 6/2009 |

OTHER PUBLICATIONS

Taiwanese Patent Office issued Office Action on Jan. 29, 2013.
Chinese Patent Office issued Office Action Feb. 27, 2013.
Taiwan Patent Office, Office Action issued on May 31, 2013.

* cited by examiner

*Primary Examiner* — William Choi
*Assistant Examiner* — Sharrief Broome
(74) *Attorney, Agent, or Firm* — WPAT, PC; Justin King

(57) ABSTRACT

A display device includes a transparent active element array substrate and a color display layer. The transparent active element array substrate has a first surface and a second surface opposite to the first surface. The color display layer disposed on the first surface of the transparent active element array substrate.

13 Claims, 9 Drawing Sheets

DISPLAY DEVICE

CROSS-REFERENCE TO PARENT APPLICATION

This application claims the benefit under 35 U.S.C. §119 from Taiwan Patent Application No. TW099122975, filed on Jul. 13, 2010, the entire disclosure of which is incorporated herein by reference.

FIELD OF THE INVENTION

The present invention relates to a display device, and more particularly to a display device which is visible from both sides.

BACKGROUND OF THE INVENTION

With the development of technology, display devices, as communication interface between human beings and machines, continuously make progress and develop to multi-directions, so as to meet different requirements of human beings.

Electronic paper display devices have emerged as a new type of display devices. A conventional electronic paper display device only displays images on a single side. In order to achieve two-sided display function, two electrophoretic display panels are needed to be attached together. In such way, not only the thickness and weight of the display device are increased, but also the manufacturing cost is increased. Moreover, when the display device is in use, the two electrophoretic display panels will consume more electric energy.

SUMMARY OF THE INVENTION

The present invention provides a display device capable of displaying images on both sides thereof, and having advantages of lightless, thinness and fewer components.

To achieve the above-mentioned advantages, the present invention provides a display device including a transparent active element array substrate and a color display layer. The transparent active element array substrate has a first surface and a second surface, and the second surface is opposite to the first surface. The color display layer is disposed on the first surface of the transparent active element array substrate.

In one embodiment of the present invention, the color display layer includes a first color filter layer and a display layer. The display layer is disposed between the transparent active element array substrate and the first color filter layer.

In one embodiment of the present invention, the display device further includes a second color filter layer disposed between the display layer and the transparent active element array substrate.

In one embodiment of the present invention, the display layer includes a microcapsule electrophoretic display layer or a microcup electrophoretic display layer.

In one embodiment of the present invention, the display device includes an adhesive layer disposed between the first color filter layer and the display layer.

In one embodiment of the present invention, the color display layer includes a display layer and a second color filter layer. The second color filter layer is disposed between the display layer and the transparent active element array substrate.

In one embodiment of the present invention, the color display layer includes transparent electrophoretic liquid and a plurality of color electrophoretic particles, and the color electrophoretic particles are dispersed in the transparent electrophoretic liquid.

In one embodiment of the present invention, the display device includes a first protecting layer and a second protecting layer. The first protecting layer is disposed on the color display layer. The second protecting layer is disposed on the second surface of the transparent active element array substrate.

In one embodiment of the present invention, the first protecting layer and the second protecting layer are selected from at least one of an anti-glare film, an anti-reflective film, an ultraviolet barrier film, a water vapor barrier film and an anti-scratch film.

In one embodiment of the present invention, the first color filter layer is formed on the display layer via ink-jet method or decalcomania transfers.

The present invention also provides a display device including a transparent base, a display layer, a transparent active element array and a second color filter layer. The transparent base has a third surface and a fourth surface, and the fourth surface is opposite to the third surface. The display layer is disposed above the third surface of the transparent base. The transparent active element array is disposed between the transparent base and the display layer. The second color filter layer is disposed between the transparent base and the transparent active element array.

In one embodiment of the present invention, the display device further includes a first color filter layer disposed on the display layer.

In one embodiment of the present invention, the display device further includes an adhesive layer disposed between the first color filter layer and the display layer.

In one embodiment of the present invention, the first color filter layer is formed on the display layer via ink-jet method or decalcomania transfers.

In one embodiment of the present invention, the display layer includes a microcapsule electrophoretic display layer or a microcup electrophoretic display layer.

In one embodiment of the present invention, the display device further includes a first protecting layer and a second protecting layer. The first protecting layer is disposed on the display layer. The second protecting layer is disposed on the fourth surface of the transparent base.

In one embodiment of the present invention, the first protecting layer and the second protecting layer are selected from at least one of an anti-glare film, an anti-reflective film, an ultraviolet barrier film, a water vapor barrier film and an anti-scratch film.

In the present invention, the transparent active element array substrate used together with the display layer can realize two-sided display function without attaching two electrophoretic display panels together, thereby reducing the thickness and weight of the display device, the manufacturing cost and the consumption of electric energy.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
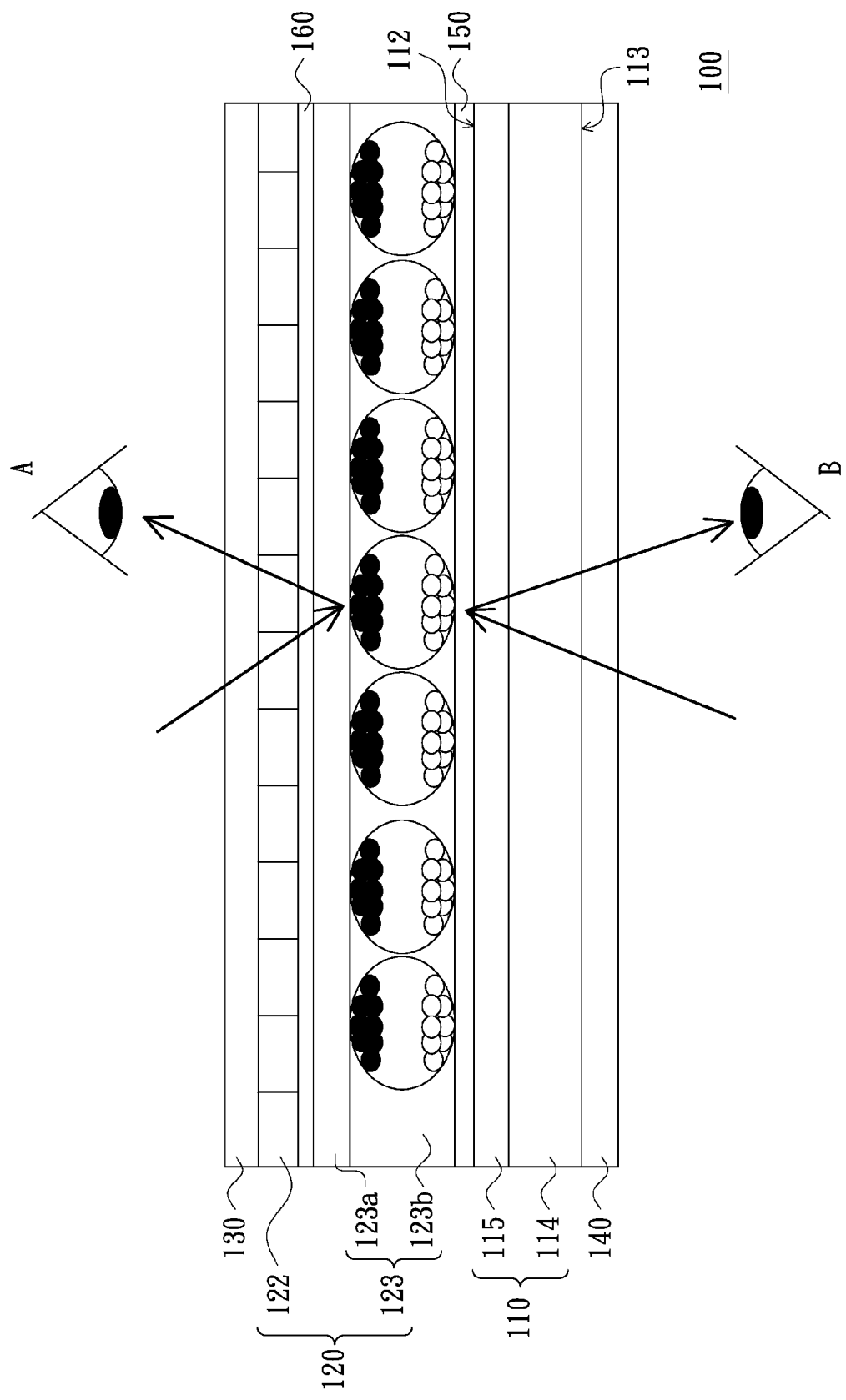
FIG. 1 is a schematic view of a display device according to a first embodiment of the present invention.

FIG. 1 is a schematic view of a display device according to a first embodiment of the present invention. Referring to FIG. 1, a display device 100 of the first embodiment of the present invention includes a transparent active element array substrate 110 and a color display layer 120. The transparent active element array substrate 110 has a first surface 112 and a second surface 113, and the second surface 113 is opposite to the first surface 112. The color display layer 120 is disposed on the first surface 112 of the transparent active element array substrate 110.

More specifically, the transparent active element array substrate 110 includes a transparent base 114 and a transparent thin film transistor 115, and the transparent thin film transistor 115 is disposed on the transparent base 114. Material of the transparent base 114, for example, includes glass or plastic. Material of the transparent thin film transistor 115, for example, includes transparent oxide semiconductor or transparent organic semiconductor.

The color display layer 120 includes a first color filter layer 122 and a display layer 123. The display layer 123 is disposed between the transparent active element array substrate 110 and the first color filter layer 122. In the present embodiment, the display layer 123, for example, includes an electrode 123a and a microcapsule electrophoretic layer 123b, but the present invention is not limited to the embodiment.

In the present embodiment, an adhesive layer 160 is further disposed between the first color filter layer 122 and the display layer 123 and is configured to adhere the first color filter layer 122 to the display layer 123. Material of the adhesive layer 160 is, for example, epoxy resin, acrylic resin or other light-transmitting adhesive material.

In addition, an adhesive layer 150 is further disposed between the display layer 123 and the transparent active element array substrate 110 and is configured to adhere the display layer 123 to the first surface 112 of the transparent active element array substrate 110.

It should be noted that, the display device 100 further includes a first protecting layer 130 and a second protecting layer 140. The first protecting layer 130 is disposed on the color display layer 120. The second protecting layer 140 is disposed on the second surface 113 of the transparent active element array substrate 110. The first protecting layer 130 and the second protecting layer 140 can be, but not limited to, selected from at least one of an anti-glare film, an anti-reflective film, an ultraviolet (UV) barrier film, a water vapor barrier film and an anti-scratch film. The first protecting layer 130 and the second protecting layer 140 can protect the display device 100 and prevent the first color filter layer 122 and the transparent base 114 from being scratched.

In the present embodiment, the active element array substrate 110 is transparent and is used together with the color display layer 120. Therefore, no matter a viewer watches the display device 100 from A side or from B side, color images can be seen.

Figure 2:
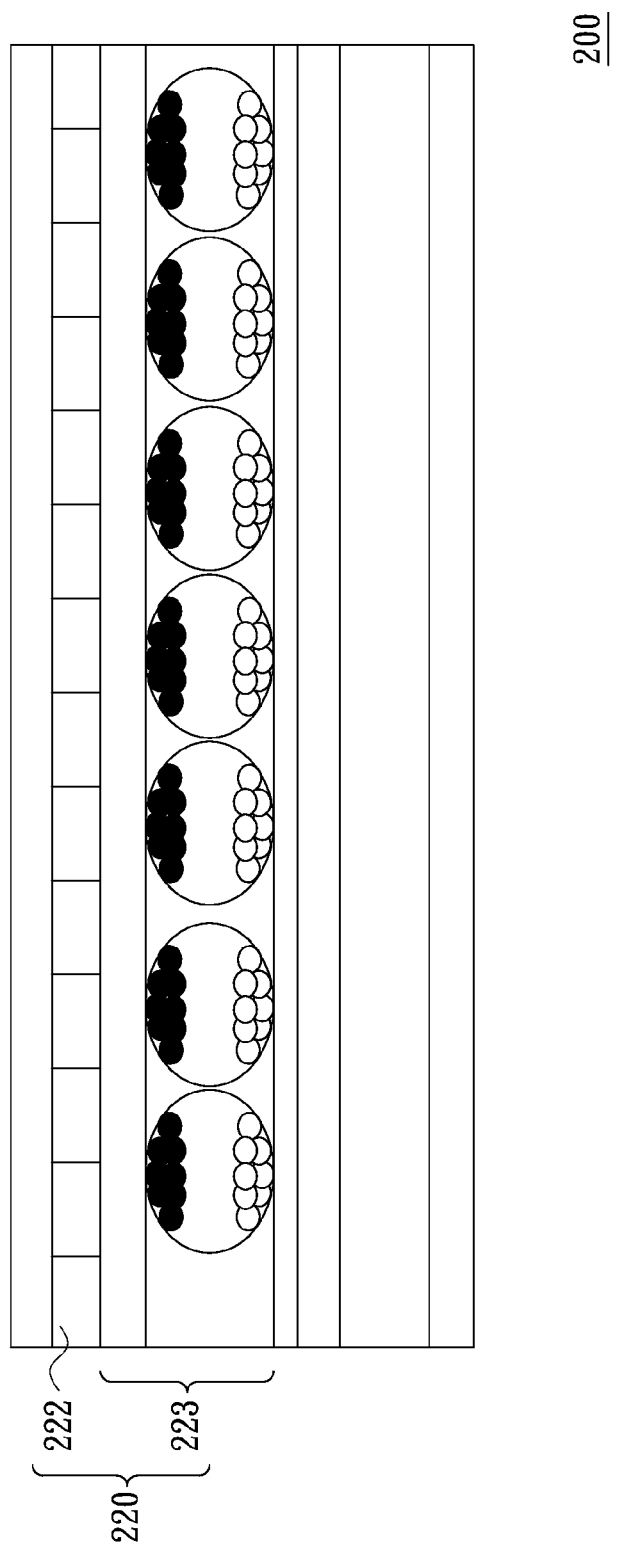
FIG. 2 is a schematic view of a display device according to a second embodiment of the present invention.

FIG. 2 is a schematic view of a display device according to a second embodiment of the present invention. Referring to FIG. 2, a display device 200 of the second embodiment of the present invention is similar to the display device 100 of the first embodiment, the difference is that a first color filter layer 222 of a color display layer 220 of the display device 200 is formed on a display layer 223 via ink-jet method or decalcomania transfers. That is, there is not any adhesive material disposed between the first color filter layer 222 and the display layer 223.

Figure 3:
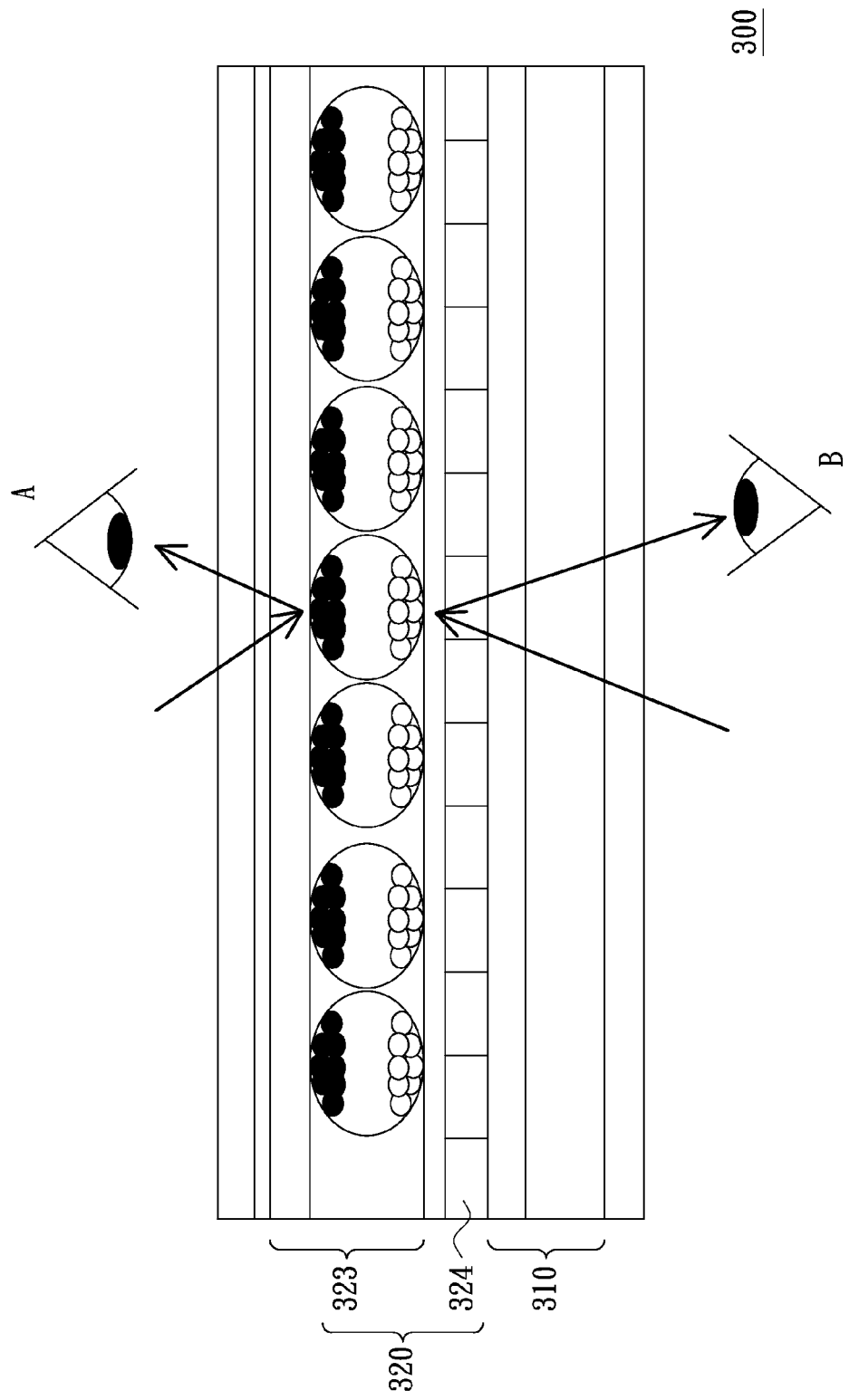
FIG. 3 is a schematic view of a display device according to a third embodiment of the present invention.

FIG. 3 is a schematic view of a display device according to a third embodiment of the present invention. Referring to FIG. 3, a display device 300 of the third embodiment of the present invention is similar to the display device 100 of the first embodiment, the difference is that, a color display layer 320 of the display device 300 includes a display layer 323 and a second color filter layer 324, and the second color filter layer 324 is disposed between the display layer 323 and a transparent active element array substrate 310.

Figure 4:
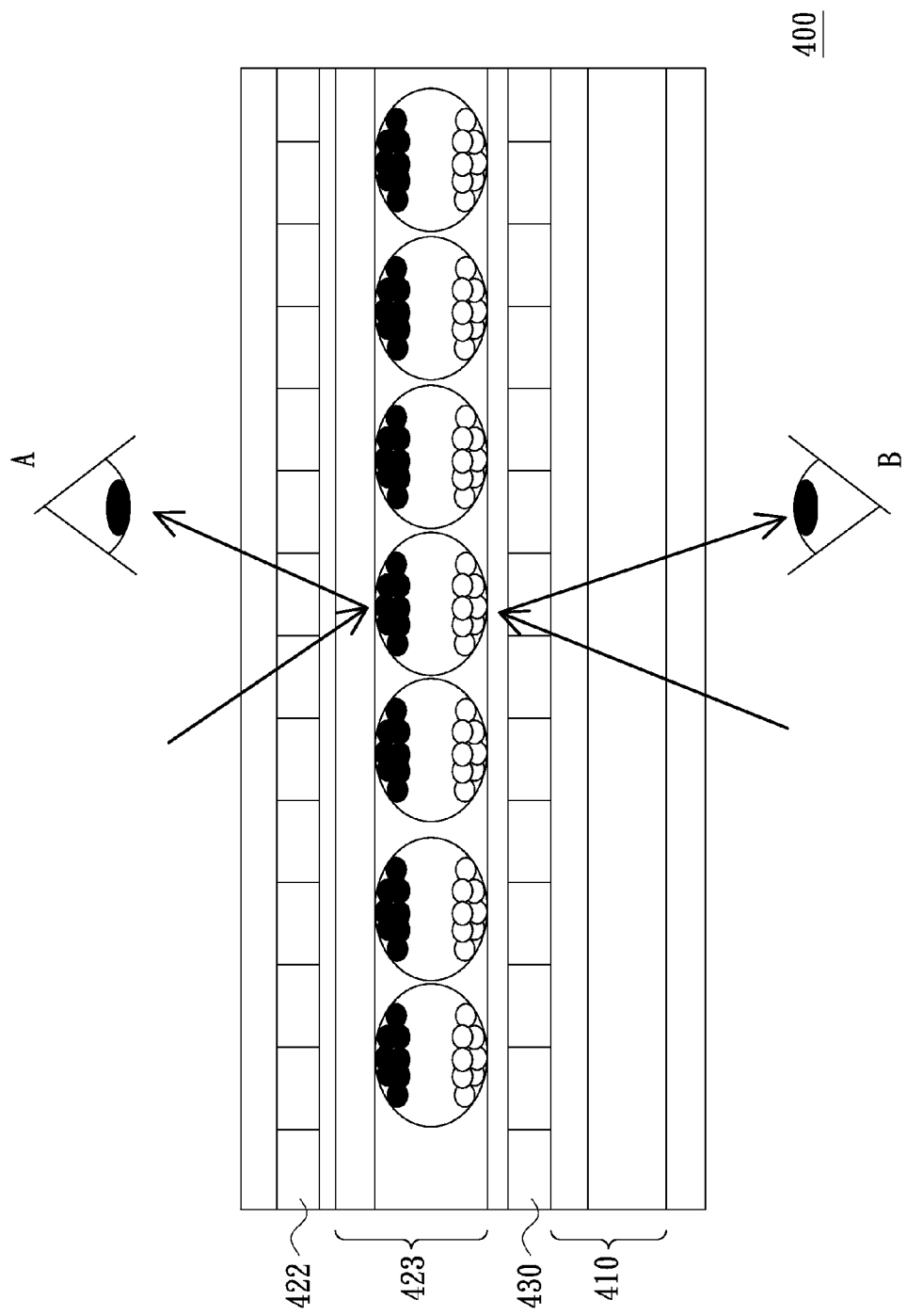
FIG. 4 is a schematic view of a display device according to a fourth embodiment of the present invention.

FIG. 4 is a schematic view of a display device according to a fourth embodiment of the present invention. Referring to FIG. 4, a display device 400 of the fourth embodiment of the present invention is similar to the display device 100 of the first embodiment, the difference is that, the display device 400 further includes a second color filter layer 430, and the color filter layer 430 is disposed between a display layer 423 and a transparent active element array substrate 410. Moreover, color and arrangement of a first color filter layer 422 can be different from that of the second color filter layer 430, so that the viewer can see different images from the A side and the B side.

Figure 5:
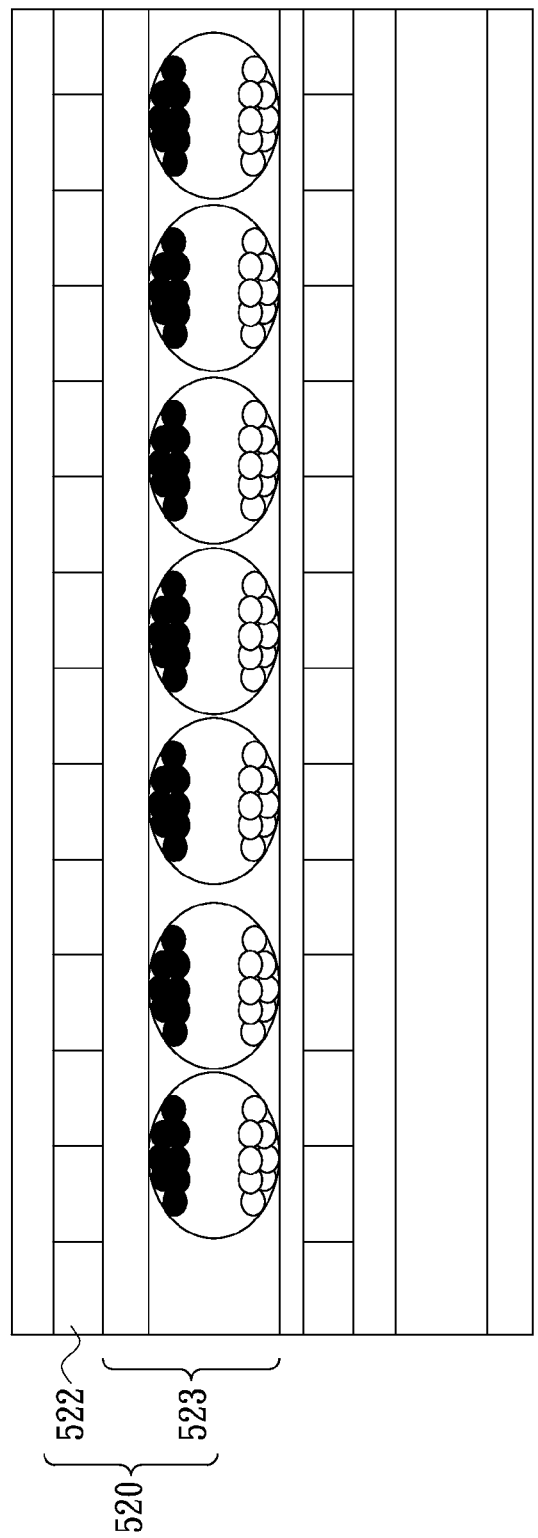
FIG. 5 is a schematic view of a display device according to a fifth embodiment of the present invention.

FIG. 5 is a schematic view of a display device according to a fifth embodiment of the present invention. Referring to FIG. 5, a display device 500 of the fifth embodiment of the present invention is similar to the display device 400 of the fourth embodiment, the difference is that, a first color filter layer 522 of a color display layer 520 of the display device 500 is formed on a display layer 523 via ink-jet method or decalcomania transfers, and the first color filter layer 522 is not adhered on the display layer 523 via adhesive material.

Figure 6:
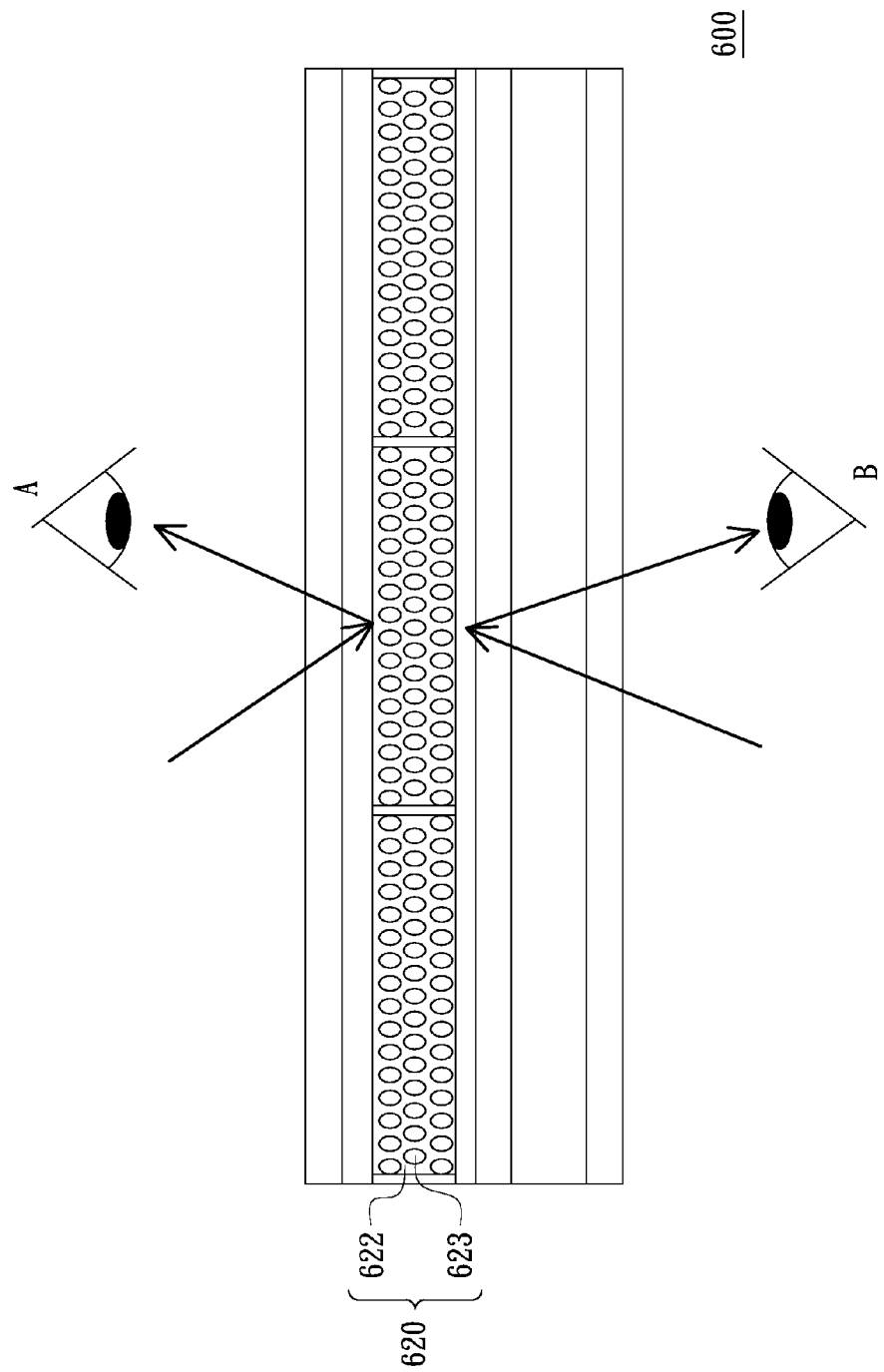
FIG. 6 is a schematic view of a display device according to a sixth embodiment of the present invention.

FIG. 6 is a schematic view of a display device according to a sixth embodiment of the present invention. Referring to FIG. 6, a display device 600 of the sixth embodiment of the present invention is similar to the display device 100 of the first embodiment, the difference is a color display layer 620. The color display layer 620 includes transparent electrophoretic liquid 622 and a plurality of color electrophoretic particles 623. The color electrophoretic particles 623 are dispersed in the transparent electrophoretic liquid 622. In the present embodiment, since the color display layer 620 can realize color display without a color filter layer, the thickness of the display device 600 can be reduced.

Figure 7:
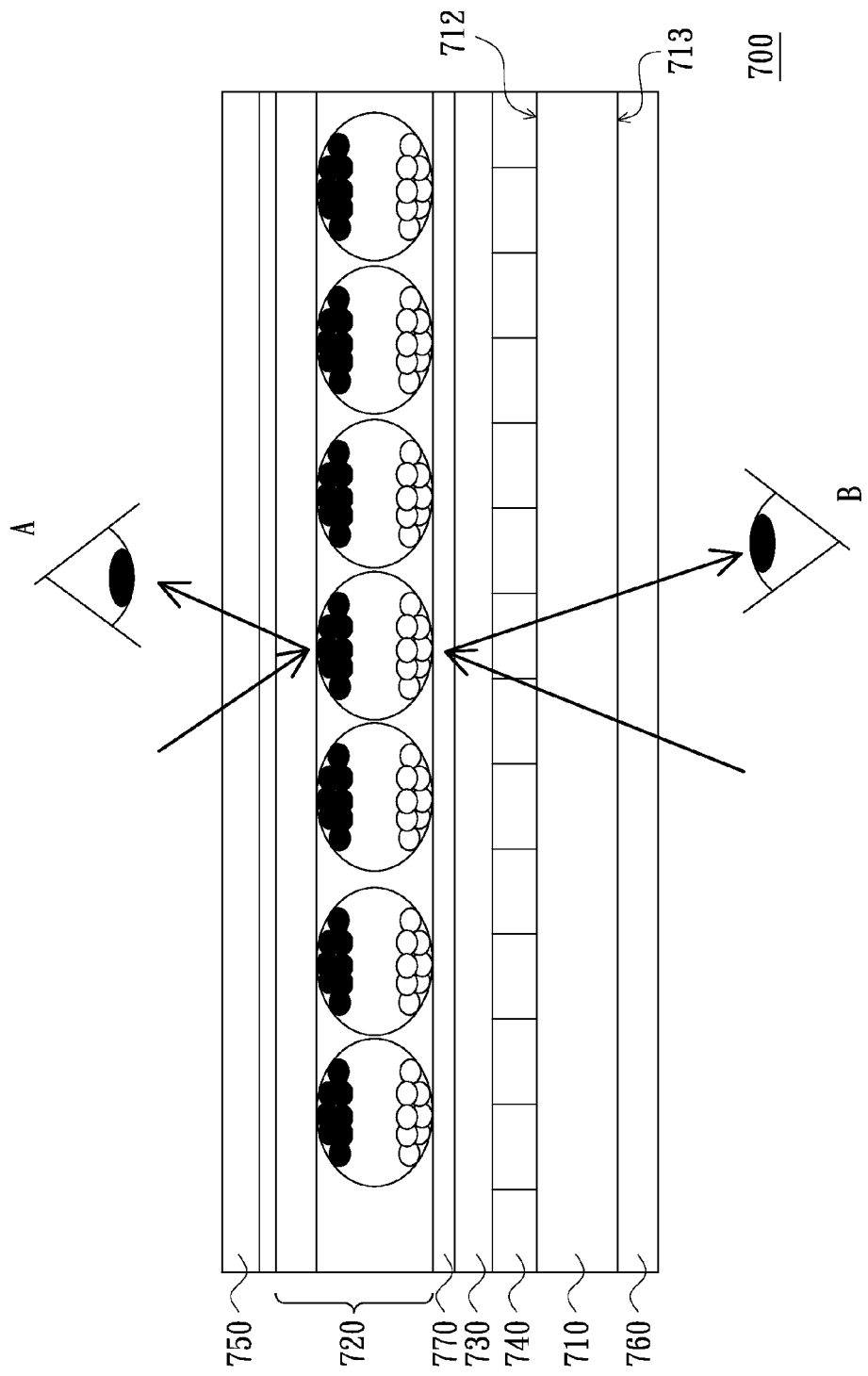
FIG. 7 is a schematic view of a display device according to a seventh embodiment of the present invention.

FIG. 7 is a schematic view of a display device according to a seventh embodiment of the present invention. Referring to FIG. 7, a display device 700 of the seventh embodiment of the present invention includes a transparent base 710, a display layer 720, a transparent active element array 730 and a second color filter layer 740. The transparent base 710 has a third surface 712 and a fourth surface 713, the fourth surface 713 is opposite to the third surface 712. The display layer 720 is disposed above the third surface 712 of the transparent base 710, and the transparent active element array 730 is disposed between the transparent base 710 and the display layer 720. In the present embodiment, the display layer 720 is adhered to the transparent active element array 730 via an adhesive layer 770. The second color filter layer 740 is disposed between the transparent base 710 and the transparent active element array 730.

It should be noted that, the display device 700 further includes a first protecting layer 750 and a second protecting layer 760. The first protecting layer 750 is disposed on the display layer 720. The second protecting layer 760 is disposed on the fourth surface 713 of the transparent base 710. Material of the first protecting layer 750 and the second protecting layer 760 is the same as or is similar to the material of the first protecting layer 130 and the second protecting layer 140 of the first embodiment.

Figure 8:
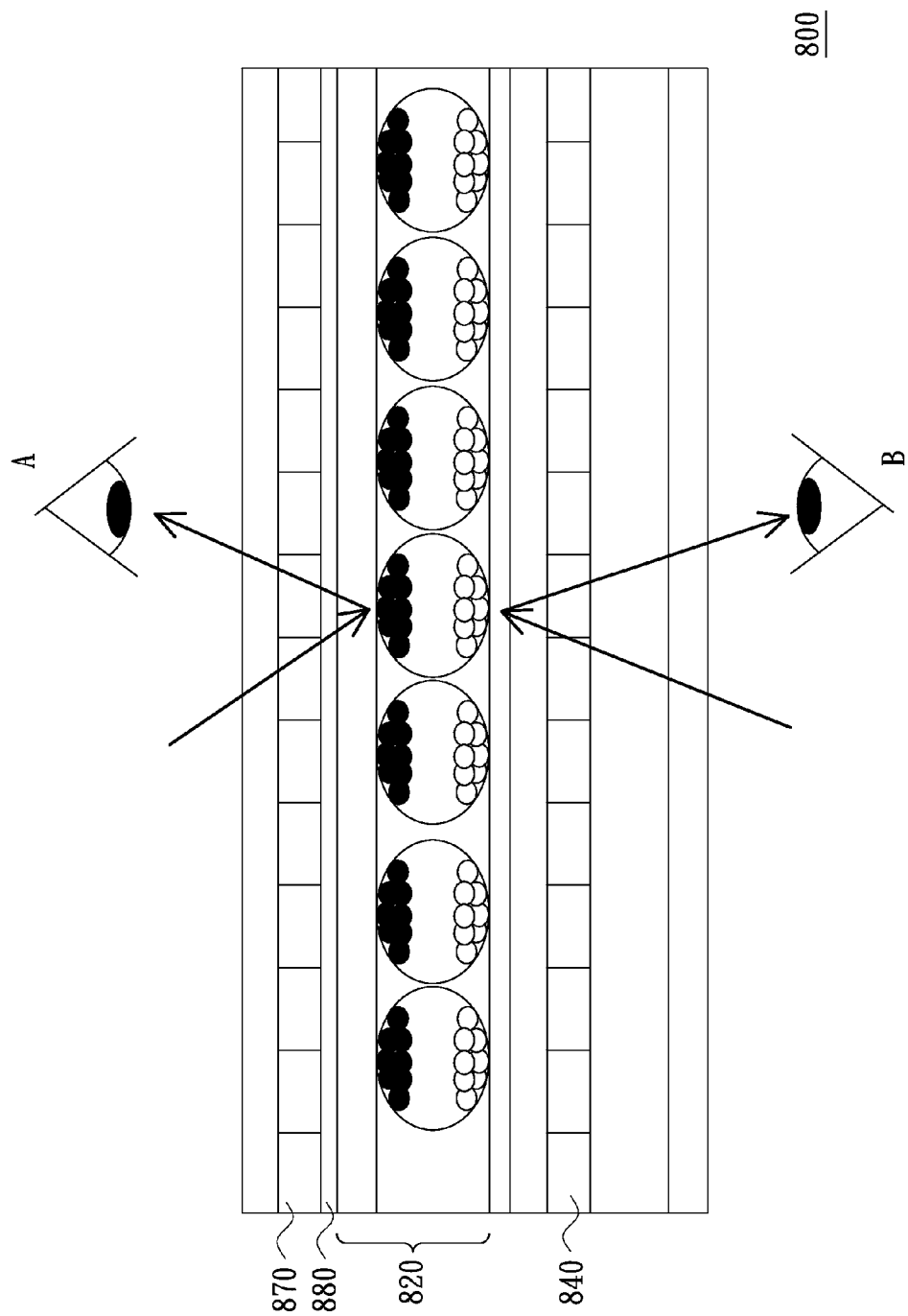
FIG. 8 is a schematic view of a display device according to an eighth embodiment of the present invention.

FIG. 8 is a schematic view of a display device according to an eighth embodiment of the present invention. Referring to FIG. 8, a display device 800 of the eighth embodiment of the present invention is similar to the display device 700 of the seventh embodiment, the difference is that, the display device 800 further includes a first color filter layer 870 and an adhesive layer 880. The first color filter layer 870 is disposed on a display layer 820. The adhesive 880 is disposed between the first color filter layer 870 and the display layer 820. Material of the adhesive layer 880 is the same as or is similar to the material of the adhesive layer 160 of the above-mentioned first embodiment. In the present embodiment, the first color filter layer 870 and a second color filter layer 840 are respectively disposed on two opposite sides of the display layer 820, and color and arrangement of the first color filter layer 870 can be different from that of the second color filter layer 840 so that the viewer can see different images from A side and B side.

Figure 9:
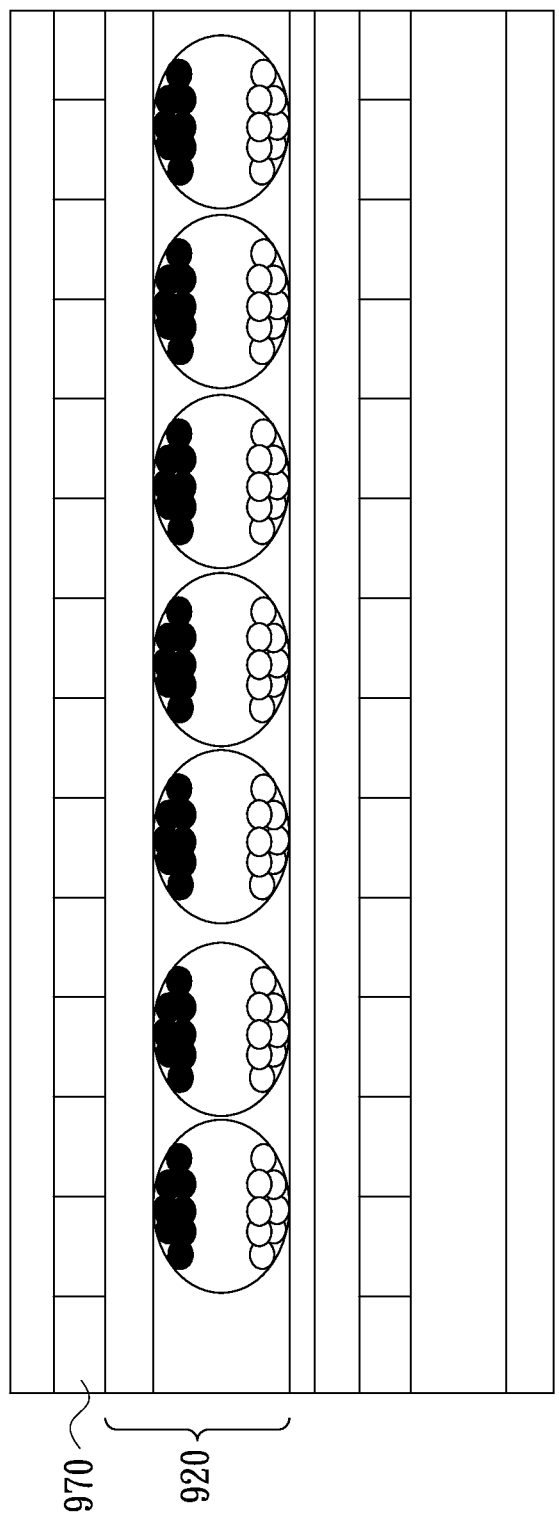
FIG. 9 is a schematic view of a display device according to a ninth embodiment of the present invention.

FIG. 9 is a schematic view of a display device according to a ninth embodiment of the present invention. Referring to FIG. 9, a display device 900 of the ninth embodiment of the present invention is similar to the display device 800 of the eighth embodiment, the difference is that, the display device 900 does not include an adhesive layer disposed between a first color filter layer 970 and a display layer 920, and the first color filter layer 970 is formed on the display layer 920 via ink-jet method or decalcomania transfers.

In summary, the display device of the present invention at least has one of the following advantages:

1. The display device of the present invention includes the transparent active element array substrate. When the transparent active element array substrate is used together with the display layer, two-sided display function can be achieved without attaching two electrophoretic display panels together, thereby reducing the thickness and weight of the display device, the manufacturing cost and the consumption of electric energy.

2. Two display surfaces of the display device of the present invention can display the same or different images according to actual requirements. For example, before image signals are processed, an image corresponding to a same image signal is displayed on the two display surfaces with different colors, which can be used in artistic creation. Moreover, after the image signals are processed, an image corresponding to the image signals can be displayed on one side display surface. When the display device is turned to the other display surface, image signals are rewritten, the same image can be entirely presented on the other display surface, or another image can be displayed on the other display surface. The display device of the present invention used together with system can be manufactured to a display device similar to a flip book.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device comprising:
   a transparent active element array substrate having a transparent base and a transparent thin film transistor, a first surface and a second surface, wherein the transparent thin film transistor is disposed on the transparent base and under the first surface, and the second surface is opposite to the first surface;
   a color display layer disposed on the transparent thin film transistor and capable of displaying color images on two opposite sides thereof paralleled with the first surface of the transparent active element array substrate, wherein the color display layer comprises:
      a first color filter layer; and
      a display layer disposed between the transparent thin film transistor and the first color filter layer, wherein the display layer is an electrophoretic layer to reflect lights to the two opposite sides of the color display layer; and
   a second color filter layer disposed between the display layer and the transparent thin film transistor, whereby the display device is capable of displaying color images on both sides thereof paralleled with the first surface of the transparent active element array substrate.

2. The display device according to claim 1, wherein the display layer comprises a microcapsule electrophoretic display layer or a microcup electrophoretic display layer.

3. The display device according to claim 1, further comprising an adhesive layer disposed between the first color filter layer and the display layer.

4. The display device according to claim 1, wherein the color display layer comprises transparent electrophoretic liquid and a plurality of color electrophoretic particles, and the color electrophoretic particles are dispersed in the transparent electrophoretic liquid.

5. The display device according to claim 1, further comprising:
   a first protecting layer disposed on the color display layer; and
   a second protecting layer disposed on the second surface of the transparent active element array substrate,
   wherein the display layer is located between the first protecting layer and the second protecting layer.

6. The display device according to claim 5, wherein the first protecting layer and the second protecting layer are selected from at least one of an anti-glare film, an anti-reflective film, an ultraviolet barrier film, a water vapor barrier film and an anti-scratch film.

7. The display device according to claim 1, wherein the first color filter layer is formed on the display layer via ink-jet method or decalcomania transfers.

8. A display device comprising:
- a transparent base having a first surface and a second surface, wherein the second surface is opposite to the first surface;
- a display layer disposed above the first surface of the transparent base and capable of displaying images on two opposite sides thereof paralleled with the first surface, wherein the display layer is an electrophoretic layer to reflect lights to the two opposite sides of the display layer;
- a transparent active element array disposed between the transparent base and the display layer;
- a second color filter layer disposed between the transparent base and the transparent active element array; and
- a first color filter layer disposed on the display layer, whereby the display device is capable of displaying color images on both sides thereof paralleled with the first surface.

9. The display device according to claim 8, further comprising an adhesive layer disposed between the first color filter layer and the display layer.

10. The display device according to claim 8, wherein the first color filter layer is formed on the display layer via ink-jet method or decalcomania transfers.

11. The display device according to claim 8, wherein the display layer comprises a microcapsule electrophoretic display layer or a microcup electrophoretic display layer.

12. The display device according to claim 8, further comprising:
- a first protecting layer disposed on the display layer; and
- a second protecting layer disposed on the second surface of the transparent base,
- wherein the display layer is located between the first protecting layer and the second protecting layer.

13. The display device according to claim 12, wherein the first protecting layer and the second protecting layer are selected from at least one of an anti-glare film, an anti-reflective film, an ultraviolet barrier film, a water vapor barrier film and an anti-scratch film.

* * * * *